United States Patent [19]

Hawker et al.

[11] Patent Number: 4,680,426
[45] Date of Patent: Jul. 14, 1987

[54] ELECTRICAL SWITCHES

[76] Inventors: Ralph L. Hawker; George Spector, both of 233 Broadway RM 3615, New York, N.Y. 10007

[21] Appl. No.: 766,978

[22] Filed: Aug. 19, 1985

[51] Int. Cl.$^4$ .............................................. H02G 3/12
[52] U.S. Cl. ...................................... 174/57; 267/153
[58] Field of Search .................. 174/53, 57; 220/3.7; 267/179, 153; 248/634

[56] References Cited

U.S. PATENT DOCUMENTS

| | | | |
|---|---|---|---|
| 1,156,771 | 10/1915 | Gilmore | 267/179 X |
| 2,980,756 | 4/1961 | Kelleher | 174/57 |
| 2,989,206 | 6/1961 | McAfee | 220/3.7 |

Primary Examiner—Arthur T. Grimley
Assistant Examiner—David A. Tone

[57] ABSTRACT

An improved outlet box for an electrical fixture is provided which biases the electrical fixture in a forward position so that the electrical fixture and its cover plate can be mounted at a proper position with respect to a finished wall surface irrespective of the thickness of the wall.

2 Claims, 4 Drawing Figures

ELECTRICAL SWITCHES

BACKGROUND OF THE INVENTION

The instant invention relates generally to outlet boxes and more specifically it relates to an improved outlet box for an electrical fixture.

Numerous outlet boxes have been provided in the prior art that are adapted to be adjustably mounted. For example, U.S. Pat. Nos. 2,989,206; 3,794,956 and 4,057,164 all are illustrative of such prior art. While these units may be suitable for the particular purpose to which they address, they would not be as suitable for the purpose of the present invention as hereinafter described.

SUMMARY OF THE INVENTION

A principal object of the present invention is to provide an improved outlet box for an electrical fixture which biases the electrical fixture in a forward position so that the electrical fixture and its cover plate can be mounted at a proper position with respect to a finished wall surface irrespective of the thickness of the wall.

Another object is to provide an improved outlet box for an electrical fixture that utilizes compression coil springs circumposed about the mounting screws for biasing the electrical fixture in a forward position.

An additional object is to provide an improved outlet box for an electrical fixture that utilizes deflection spools circumposed about the mounting screws for biasing the electrical fixture in a forward position.

A further object is to provide an improved outlet box for an electrical fixture that is economical in cost to manufacture.

A still further object is to provide an improved outlet box for an electrical fixture that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
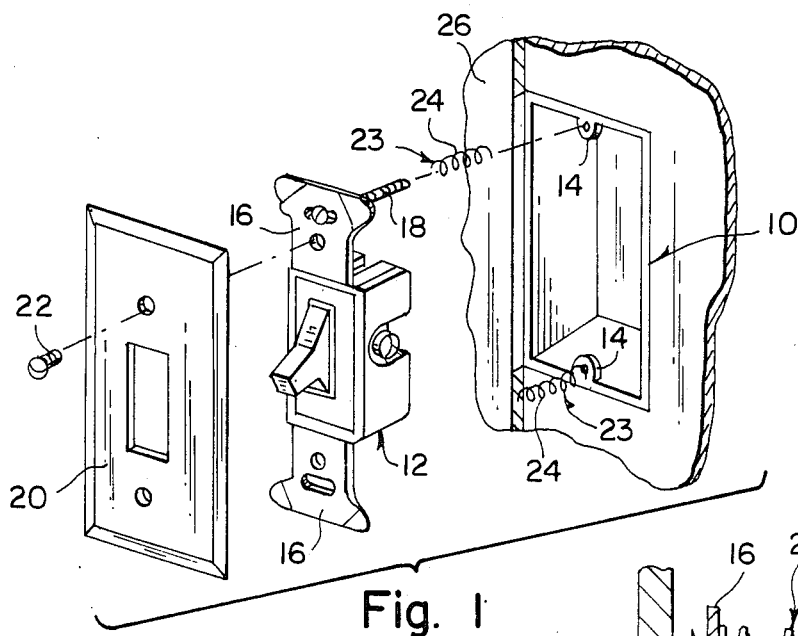
FIG. 1 is an exploded perspective view of the invention shown in position for attachment to an outlet box.
Figure 2:
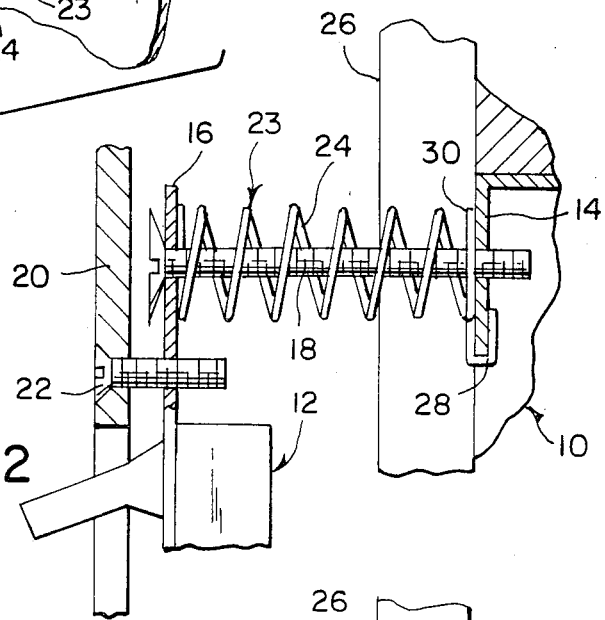
FIG. 2 is an enlarged sectional view with parts broken away of the invention attached to the outlet box.

Turning now descriptively to the drawings, in which similar reference characters denote similar elements throughout the several views, FIGS. 1 and 2 illustrate an improved outlet box 10 for an electrical fixture 12 being either a receptacle or wall switch as shown. The outlet box 10 has two mounting tabs 14, 14. The electrical fixture 12 has two mounting straps 16, 16, two mounting screws 18, 18, a cover plate 20 and at least one plate screw 22.

The improvement consists of a biasing device 23 that includes two compressioning coil springs 24, 24 for biasing the electrical fixture 12 in a forward position. Each spring 24 is circumposed about one of the mounting screws 18 between the mounting tab 14 and the mounting strap 16. The electrical fixture can be mounted at a proper position with respect to a finished wall surface 26 irrespective of the thickness of a wall 26. The cover plate 20 can be mounted to the electrical fixture 12 by at least one plate screw 22.

Each compression coil spring 24 includes a U-shaped clip-on member 28 at one end 30 (see FIG. 2). The clip-on member 28 can be attached to the mounting tab 14 to hold the spring 24 in a proper aligned position when the mounting screw 18 of the electrical fixture 12 is threaded into the mounting tab 14 of the outlet box 10.

Figure 4:
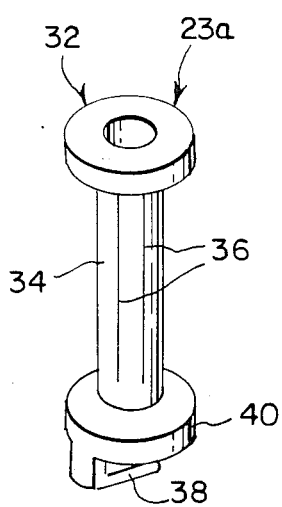
FIG. 4 is a perspective view of the deflection spool.
Figure 3:
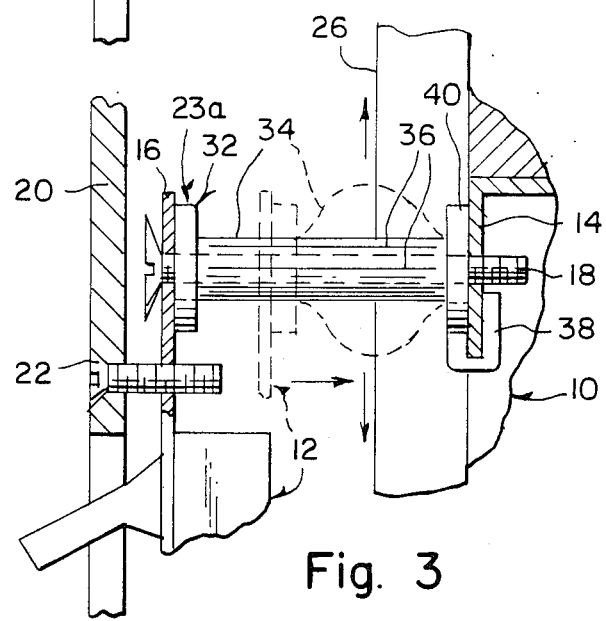
FIG. 3 is an enlarged sectional view with parts broken away similar to FIG. 2 of a modification showing a deflection spool therein.

In FIGS. 3 and 4 another type of biasing device 23a is provided that includes two deflection spools 32 of which only one is shown. Each spool 32 is made of a flexible material such as soft plastic or the like. The spool has a hollow barrel 34 with a plurality of vertical slots 36 therein. The barrel 34 is circumposed about one of the mounting screws 18 between the mounting tab 14 and the mounting strap 16 for biasing the electrical fixture 12 in a forward position as shown in dotted lines.

Each deflection spool 32 includes a U-shaped clip-on member 38 at one end 40. The clip-on member 38 can be attached to the mounting tab 14 to hold the spool 32 in a proper aligned position when the mounting screw 18 of the electrical fixture 12 is threaded into the mounting tab 14 of the outlet box 10.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved outlet box with an electrical fixture, said outlet box being of the type having two mounting tabs, said electrical fixture of the type having two mounting straps, two mounting screws, a cover plate and at least one plate screw, wherein the improvement comprises means for biasing said electrical fixture in a forward position so that said electrical fixture can be mounted at a proper position with respect to a finished wall surface irrespective of the thickness of said wall and said cover plate can be mounted to said electrical fixture by said at least one plate screw, wherein said biasing means includes two deflection spools, each said spool being of a flexible material and having a hollow barrel with a plurality of vertical slots therein, said barrel is circumposed about one of said mounting screws between said mounting tab and said mounting strap for biasing said electrical fixture in a forward position.

2. An improved outlet box as recited in claim 1 wherein each of said deflection spools includes a U-shaped clip-on member at one end so that said clip-on member can be attached to said mounting tab to hold said spool in a proper aligned position when said mounting screw of said electrical fixture is threaded into said mounting tab of said outlet box.

\* \* \* \* \*